US011272008B2

(12) United States Patent
Osawa

(10) Patent No.: US 11,272,008 B2
(45) Date of Patent: Mar. 8, 2022

(54) COMMUNICATION SYSTEM AND COMMUNICATION METHOD

(71) Applicant: Nippon Telegraph and Telephone Corporation, Tokyo (JP)

(72) Inventor: Hiroshi Osawa, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 16/975,861

(22) PCT Filed: Feb. 25, 2019

(86) PCT No.: PCT/JP2019/007096
§ 371 (c)(1),
(2) Date: Aug. 26, 2020

(87) PCT Pub. No.: WO2019/167892
PCT Pub. Date: Sep. 6, 2019

(65) Prior Publication Data
US 2020/0412805 A1 Dec. 31, 2020

(30) Foreign Application Priority Data
Mar. 2, 2018 (JP) .............................. JP2018-037614

(51) Int. Cl.
*H04L 29/08* (2006.01)
*H04L 12/715* (2013.01)
(Continued)

(52) U.S. Cl.
CPC .......... *H04L 67/1097* (2013.01); *H04L 45/04* (2013.01); *H04L 45/34* (2013.01); *H04L 45/42* (2013.01); *H04L 12/4641* (2013.01)

(58) Field of Classification Search
CPC ...... H04L 67/1097; H04L 45/04; H04L 45/42; H04L 12/4641
See application file for complete search history.

(56) References Cited

U.S. PATENT DOCUMENTS

| 10,530,632 | B1* | 1/2020 | Mukhopadhyaya ........................ H04L 41/5041 |
| 2018/0219762 | A1* | 8/2018 | Wang .................. H04L 67/2809 |

(Continued)

OTHER PUBLICATIONS

Clad et al., "Segment Routing for Service Chaining," Spring, Jan. 8, 2018, 35 pages.

(Continued)

*Primary Examiner* — Tonia L Dollinger
*Assistant Examiner* — Jihad K Boustany
(74) *Attorney, Agent, or Firm* — Fish & Richardson P.C.

(57) ABSTRACT

A construction unit of a conversion device constructs a VPN connected to a VNF in a cloud platform, and a distribution unit distributes a default route designating the conversion device as a transmission destination to a router and another conversion device, and distributes a redirect route to the VNF to which the conversion device belongs to the router. A transfer instruction unit of a controller provides an instruction of a transfer destination of a packet to the conversion device connected to the same cloud platform, the VNF, or another controller. A transfer unit of the conversion device transfers the packet to a recent VNF in the processing order of a chain where the VNF is in the same cloud platform, and transfers the packet to a conversion device connected to the VNF where the VNF is in a cloud platform that is different from the same cloud platform.

10 Claims, 10 Drawing Sheets

(51) Int. Cl.
  *H04L 12/717* (2013.01)
  *H04L 12/721* (2013.01)
  *H04L 12/46* (2006.01)
  *H04L 67/1097* (2022.01)
  *H04L 45/00* (2022.01)
  *H04L 45/42* (2022.01)

(56) References Cited

U.S. PATENT DOCUMENTS

2018/0351874 A1* 12/2018 Abhigyan ............ H04L 12/4641
2019/0132220 A1*  5/2019 Boutros .............. H04L 47/2483
2019/0379635 A1* 12/2019 Sundararajan ........ H04L 61/256

OTHER PUBLICATIONS

Docs.opendaylight.org, [online], "Service Function Chaining—Open Day light Documentation Oxygen documentation," 2018, retrieved on Aug. 4, 2020, retrieved from URL <https://docs.opendaylight.org/en/stable-oxygen/user-guide/service-function-chaining.html#opendaylight-service-function-chaining-sfc-overview>, 58 pages.

Docs.openstack.org, [online], "Sendee Function Chaining," 2019, retrieved on Aug. 4, 2020, retrieved from URL<https://docs.openstack.oig/ocata/ja/networking-guide/config-sfc.html>, 15 pages (with English Translation).

Marques et al., "Dissemination of Flow Specification Rules," Network Working Group, Aug. 2009, 22 pages.

Okubo, "Implement and Operate Sendee Chaining," Interop Tokyo 2017 ShowNetNOC team, Jun. 7, 2017, 27 pages (with English Translation).

Quinn et al., "Network Service Header (NSH)," Internet Engineering Task Force (IETF), Jan. 2018, 24 pages.

\* cited by examiner

COMMUNICATION SYSTEM AND COMMUNICATION METHOD

CROSS-REFERENCE TO RELATED APPLICATIONS

This application is a National Stage application under 35 U.S.C. § 371 of International Application No. PCT/JP2019/007096, having an International Filing Date of Feb. 25, 2019, which claims priority to Japanese Application Serial No. 2018-037614, filed on Mar. 2, 2018. The disclosure of the prior application is considered part of the disclosure of this application, and is incorporated in its entirety into this application

TECHNICAL FIELD

The present invention relates to a communication system and a communication method.

BACKGROUND ART

In recent years, the importance of a technology called service chaining for drawing only necessary traffic to a service function has increased due to progress in cloud and Network Functions Virtualization (NFV) technologies. Also, edge computing in which servers are arranged in a distributed manner near user terminals and a concept called Central Office Re-architected as a Datacenter (CORD) in which accommodation stations near user terminals are re-designed as so-called clouds have been proposed. Thus, there has been a need for a technology of service chaining that can be applied to a wide range across a plurality of clouds/Data Centers (DCs).

In the related art, technologies that can be used for service chaining are roughly classified into three types, that is, a type for a Wide Area Network (WAN), a type for a cloud/DC, and a type for a wide area that can be used for both a WAN section and a cloud/DC section.

Specifically, Border Gateway Protocol (BGP) FlowSpec is known as a service chaining technology for a WAN (see Non Patent Literature 1 and Non Patent Literature 2). In other words, it is possible to route only a specific flow on the basis of an independent table called a Virtual Routing and Forwarding Table (VRF) using BGP.

As service chaining technologies for a cloud/DC, OpenStack (see Non-Patent Literature 3) and OpenDayLight (see Non Patent Literature 4) are known. In other words, it is possible to perform steering in which a controller provides an instruction of a packet destination in each Service Function Forwarder (SFF) using OpenFlow or the like to perform transmission in a direction that is different from that in an ordinary IP routing in a cloud platform. Also, NSH (see Non Patent Literature 5) and Segment Routing (see Non Patent Literature 6) have been disclosed as service chaining technologies for a wide area.

CITATION LIST

Non Patent Literature

Non Patent Literature 1: "Dissemination of Flow Specification Rules", [online], 2009, [searched on Feb. 15, 2018], Internet <URL: https://tools.ietf.org/html/rfc5575>
Non Patent Literature 2: Shuichi Okubo, "Implementation and running of service chaining in Interop Tokyo 2017 ShowNet, [online], 2017, [searched on Feb. 15, 2018]; Internet <URL: https://www.janog.gr.jp/meeting/janog40/application/files/6115/0123/2051/janog40-lt2-ohkubo.pdf>
Non Patent Literature 3: "Service Function Chaining", [online], 2018, [searched on Feb. 15, 2018], Internet <URL: https://docs.openstack.org/ocata/ja/networking-guide/config-sfc.html>
Non Patent Literature 4: "Service Function Chaining OpenDaylight Service Function Chaining (SFC) Overview", [online], 2016; [searched on Feb. 15, 2018], Internet <URL: http://docs.opendaylight.org/en/stable-nitrogen/user-guide/service-function-chaining.html>
Non Patent Literature 5: "Network Service Header (NSH)", [online], 2018, [searched on Feb. 26, 2018], Internet <URL: https://www.rfc-editor.org/rfc/rfc8300.txt>
Non Patent Literature 6: "Segment Routing for Service Chaining", [online], 2018, [searched on Feb. 26, 2018]; Internet <URL: https://tools.ietf.org/html/draft-xuclad-spring-sr-service-chaining-00>

SUMMARY OF THE INVENTION

Technical Problem

However, it is difficult to apply the technologies in the related art to a wide area across a plurality of clouds/DCs. For example, it is difficult to apply BGP FlowSpec for a WAN to all general-purpose servers in a DC and to apply it to a cloud/DC section because a large amount of routing resources such as Routing Information Bases (RIB) are consumed.

Also, it is difficult to extend OpenStack or the like for a cloud/DC because it is necessary to perform setting of OpenFlow or the like for all SFFs that are targets of steering. It is difficult to apply OpenFlow or the like, in which control is performed using a single controller, to a WAN section because a variety of dedicated routers that incur large costs for user transition, namely migration and include old types may coexist in WAN sections.

NSH and segment routing that can be applied to both a WAN section and a cloud/DC section are novel technologies, and implementation thereof has not advanced. In particular, it is difficult to apply these technologies to old-type devices for a WAN section in terms of performance and support periods, and early introduction of these technologies has been difficult.

The present invention was made in view of the above circumstances, and an object thereof is to easily implement service chaining in a wide area across a plurality of clouds/DCs.

Means for Solving the Problem

In order to solve the aforementioned problem and to achieve the object, a communication system according to the present invention includes: a conversion device configured to connect cloud platforms to a Wide Area Network (WAN); and controllers respectively disposed for the cloud platforms, each of the controllers including a first storage unit configured to store a chain that designates, in a processing order, Virtual Network Functions (VNFs) that process a packet received from a user terminal, and a transfer instruction unit configured to provide an instruction of a transfer destination of the packet to a conversion device connected to a same cloud platform, a VNF, or another controller in accordance with the processing order of the chain, and the conversion device including a second storage unit configured to store the chain, a construction unit configured to construct a Virtual Private Network (VPN), which is connected to a VNF in a cloud platform, in the WAN, a distribution unit configured to distribute, to a router in the WAN or another conversion device, a route designating the conversion device as a transmission destination that is a route to the VNF in the cloud platform to which the conversion device belongs and distribute, to the router in the WAN, a route to a VNF at a head of the chain when the VNF is in the cloud platform to which the conversion device belongs, and a transfer unit configured to transfer a received packet to a recent VNF in the processing order of the chain when the VNF is in the cloud platform to which the conversion device belongs and configured to transfer the received packet to the conversion device connected to the recent VNF in the processing order of the chain when the VNF is in a cloud platform that is different from the cloud platform to which the conversion device belongs.

Effects of the Invention

According to the present invention, it is possible to easily implement service chaining in a wire area across a plurality of clouds/DCs.

DESCRIPTION OF EMBODIMENTS

Hereinafter, an embodiment of the present invention will be described in detail with reference to drawings. Note that the present invention is not limited by the embodiment. In addition, the same reference signs will be applied to the same parts in illustration of the drawings.

Outline of Processing of Communication System

Figure 1:
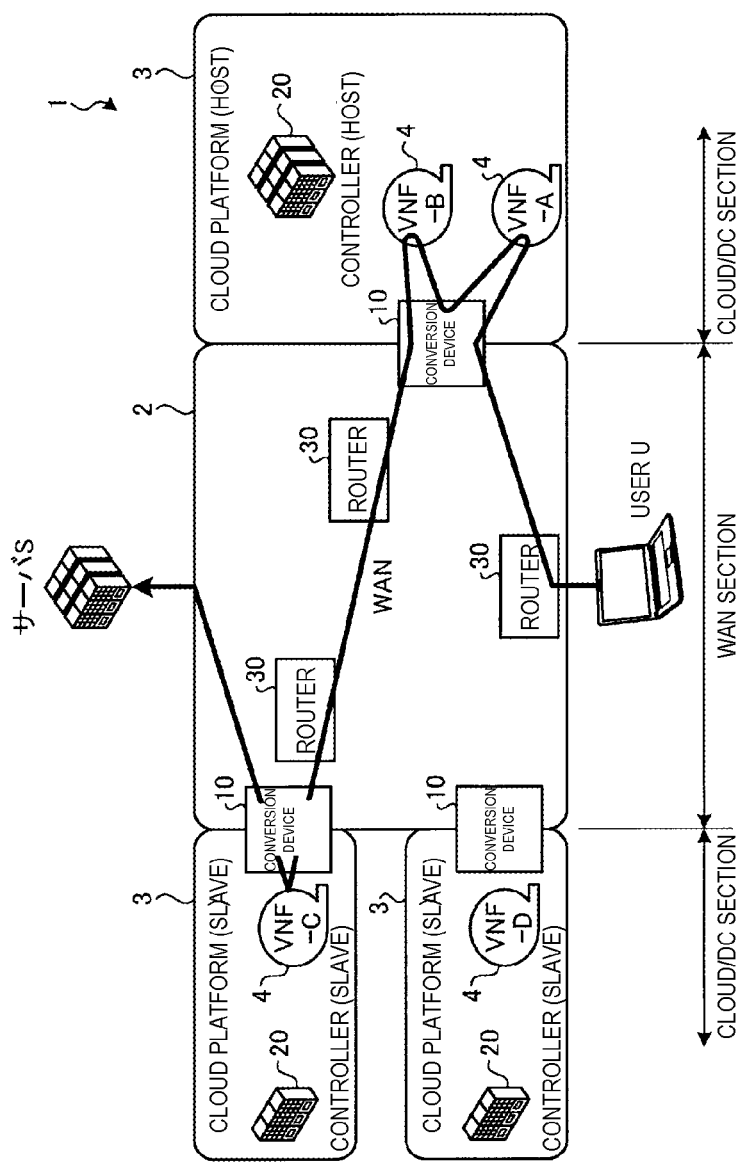
FIG. 1 is an explanatory diagram for explaining an outline of processing of a communication system according to an embodiment.
Figure 2:
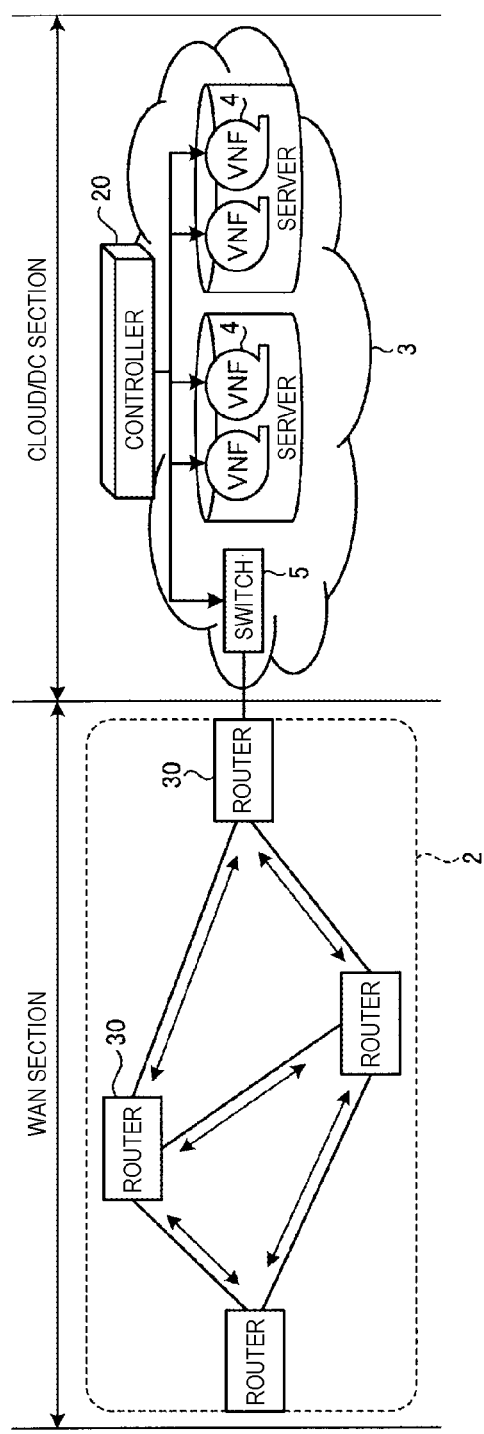
FIG. 2 is an explanatory diagram for explaining an outline of processing of the communication system according to the embodiment.

FIG. 1 and FIG. 2 are explanatory diagrams for explaining an outline of processing of a communication system according to the embodiment. First, conversion devices 10 and controllers 20 are connected to a network in a communication system 1 according to the embodiment as illustrated as an example in FIG. 1.

The conversion devices 10 are devices configured to connect cloud platforms 3 to a WAN 2 and are disposed at boundaries of the cloud platforms 3 and the WAN 2. The conversion devices 10 transfer packets received via the WAN 2 to devices in the cloud platforms 3 with VNFs 4.

The controllers 20 are disposed for the respective cloud platforms 3, Control Classifiers (CLs)/SFFs in the respective cloud platforms 3 of the controllers 20, and cause the CLs/SFFs to transfer packets. In other words, the controllers 20 cause the VNFs 4 in the respective cloud platforms 3 of the controllers 20 to transfer packets transferred from the conversion devices 10 into the cloud platforms 3 in a processing order designated by a chain.

Here, the chain is information designating the processing order of the VNFs 4 that are caused to perform processing of packets received from users. For example, a processing order of packet traffic is designated by a chain such that "packets from a user U to a web server S are processed in an order of VNF-A→VNF-B→VNF-C". The chain is set in advance for each of controllers 20 that are slave machines, the conversion devices 10, and CLs/SFFs through instructions from a controller 20 that is one host machine that is present in the communication system 1.

As illustrated in FIG. 2, the WAN 2 is configured of multiple routers 30. Packets received from user terminals are transferred to destinations such as web servers via the routers 30 that are controlled by a BGP in a distributed manner.

The cloud platforms 3 are virtualized environments constructed using OpenStack or the like, and the VNFs 4 that are virtualized network functions are operated therein. In the cloud platforms 3, packet traffic is transferred to the respective VNFs 4 via switches 5 through control by the controllers 20.

Then, a routing protocol such as BGP FlowSpec and a VPN technology are used to draw target traffic into closest cloud platforms 3, in which necessary types of VNFs 4 are present, in the WAN section in the communication system 1 as illustrated in FIG. 1. Also, traffic is guided to necessary VNFs 4 in the cloud platforms 3 in a proper order using OpenFlow or the like in cloud/DC sections.

Configuration of Communication System

Figure 3:
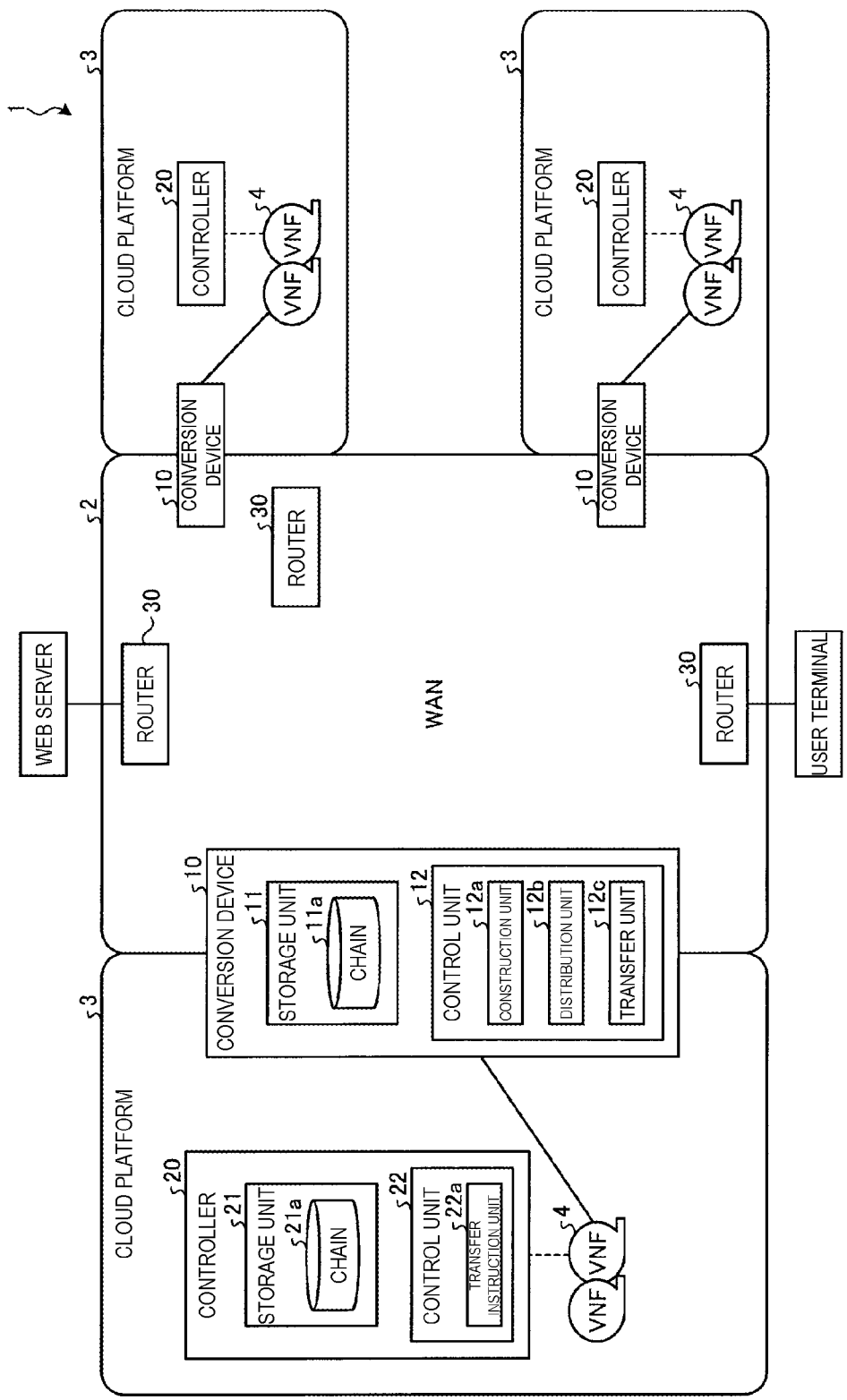
FIG. 3 is a schematic diagram illustrating an exemplary outline configuration of the communication system according to the embodiment.

Next, the communication system 1 according to the embodiment will be described with reference to FIG. 3. FIG. 3 is a schematic diagram illustrating an exemplary outline configuration of the communication system 1 according to the embodiment. As illustrated in FIG. 3, the communication system 1 has the conversion devices 10 configured to connect the cloud platforms 3 to the WAN 2 and the controllers 20 disposed for the respective cloud platforms 3. The controllers 20 include a single host machine and the other slave machines.

Each of the controllers 20 is implemented by a general-purpose computer such as a personal computer and includes a storage unit 21 and a control unit 22 as illustrated in FIG. 3.

The storage unit 21 is implemented by a semiconductor memory device such as a RAM or a flash memory or a storage device such as a hard disk or an optical disc. The storage unit 21 stores a processing program for causing the controller 20 to operate and data and the like used during execution of the processing program in advance or temporarily stores the processing program, the data, and the like every time processing is performed. Note that the storage unit 21 may be configured to communicate with the control unit 22 via a communication control unit that is implemented by a NIC or the like, which is not illustrated.

In each controller 20 according to the embodiment, the storage unit 21 stores a chain 21*a* that is information for designating VNFs that performs processing of packets received from a user terminal in a processing order. The chain 21*a* is set in advance in the storage unit 21 of the controller 20 host machine in accordance with service setting for each user. Also, the chain 21*a* is set in advance for the controller 20 slave machines through instructions from the controller 20 host machine as will be described later.

Each control unit 22 is implemented using a CPU or the like and executes the processing program stored in the memory. In this manner, the control unit 22 functions as a transfer instruction unit 22*a* as illustrated as an example in FIG. 3.

The transfer instruction unit 22*a* provides an instruction of a transfer destination of a packet to the conversion device 10 connected to the same cloud platform 3, the VNF 4, or other controller 20 in accordance with the processing order of the chain.

Specifically, the transfer instruction unit 22*a* uses OpenFlow or the like to provide an instruction for transfer to each VNF 4 via the switch 5 in the same cloud platform 3. Also, in a case in which a recent VNF-C in the processing order of the chain is not in the same cloud platform 3, the transfer instruction unit 22*a* provides an instruction of a transfer destination of the packet to the conversion device 10 connected to the same cloud platform 3 and the controller 20 in another cloud platform 3.

Each device that has received the instruction of the transfer destination uses a route distributed by the conversion device 10 as will be described later to set a route corresponding to the chain.

Each conversion device 10 is implemented by a general-purpose computer such as a personal computer, for example, and includes a storage unit 11 and a control unit 12 as illustrated in FIG. 3.

The storage unit 11 is implemented by a semiconductor memory device such as a Random Access Memory (RAM) or a flash memory or a storage device such as a hard disk or an optical disc. The storage unit 11 stores a processing program for causing the conversion device 10 to operate and data and the like used during execution of the processing program in advance or temporally stores the processing program, the data, and the like every time processing is performed.

In each conversion device 10 according to the embodiment, the storage unit 11 stores a chain 11*a* that is similar to the chain 21 of the controller 20. The chain 11*a* is set in advance through an instruction from the controller 20 host machine as will be described later. Note that the storage unit 11 may be configured to communicate with the control unit 12 via a communication control unit that is implemented by a Network Interface Card (NIC) or the like, which is not illustrated.

The control unit 12 is implemented by a Central Processing Unit (CPU) or the like and executes the processing program stored in the memory. In this manner, the control unit 12 functions as a construction unit 12*a*, a distribution unit 12*b*, and a transfer unit 12*c* as illustrated in FIG. 3.

The construction unit 12*a* constructs VPNs connected to the VNFs 4 in the cloud platform 3 in the WAN 2. Also, the construction unit 12*a* further constructs VPNs for transmitting packets to destination user terminals at an end of the chain.

Figure 4:
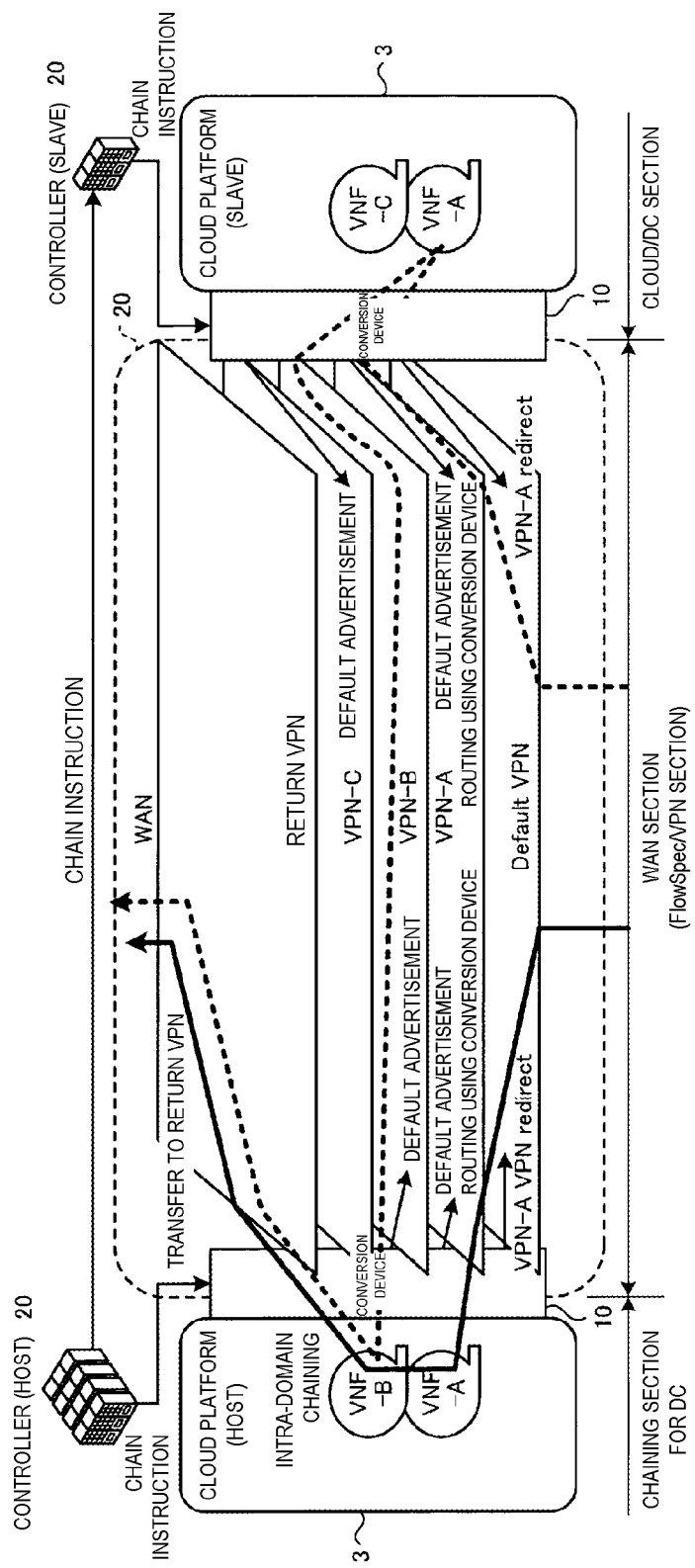
FIG. 4 is an explanatory diagram for explaining processing of the communication system.
Figure 5:
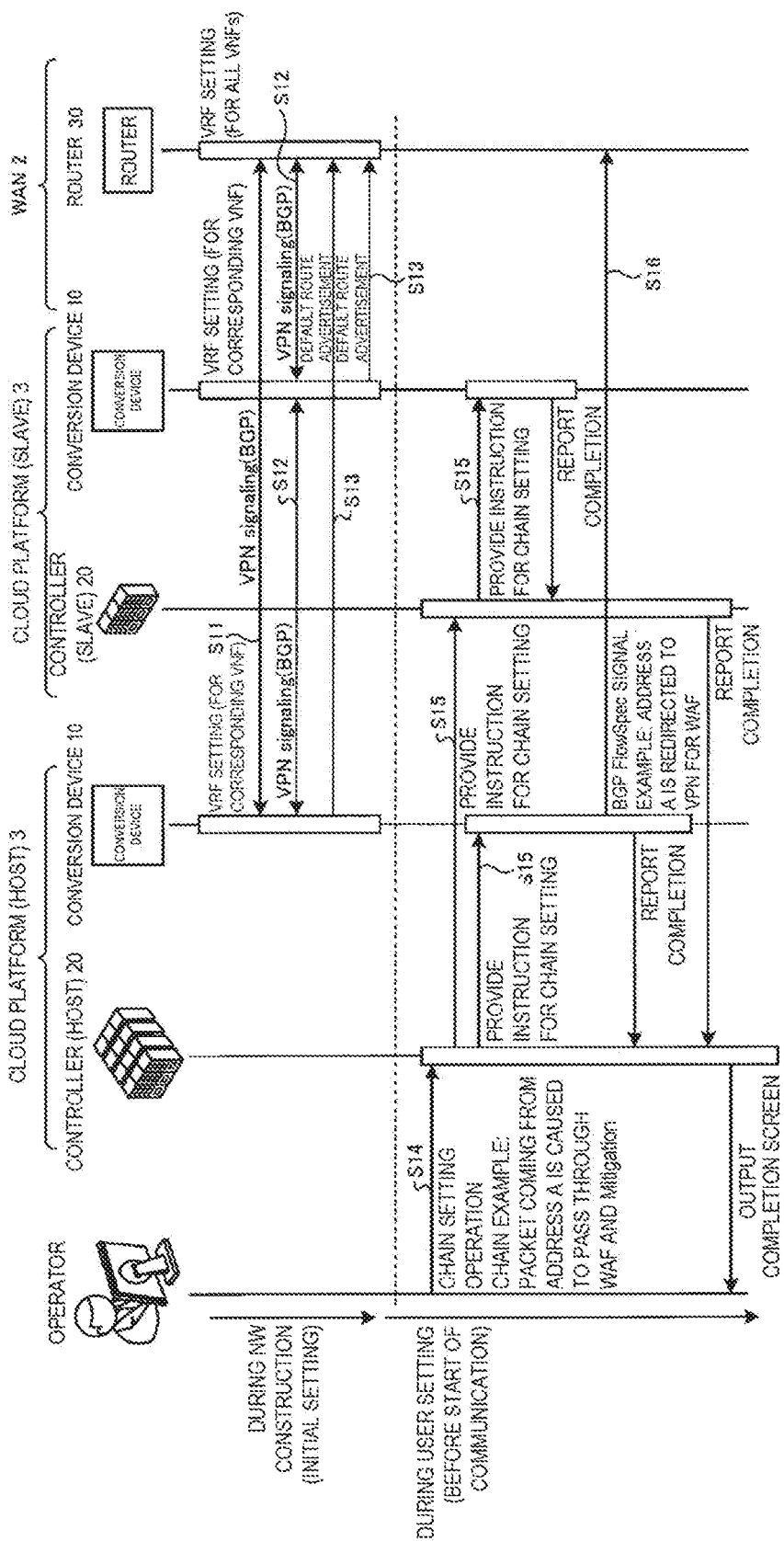
FIG. 5 is an explanatory diagram for explaining processing of the communication system.

Here, FIG. 4 and FIG. 5 are explanatory diagrams for explaining processing of the communication system 1. First, the construction unit 12*a* constructs VPNs connected to the VNFs 4 in the cloud platform 3 in the WAN 2 as illustrated as an example in FIG. 4. For example. FIG. 4 illustrates that a VPN-A connected to a VNF-A, a VPN-B connected to a VNF-B, a VPN-C connected to a VNF-C, and the like are set.

Specifically, the construction unit 12*a* constructs the VPNs connected to the VNFs 4 in the same cloud platform 3 first in initial setting at the time of network construction as illustrated as an example in FIG. 5. In other words, the construction unit 12*a* transmits and receives BGP signals to and from the routers 30 in the WAN 2 and sets a Virtual Routing Forwarding table (VRF) that is a routing table of the VPNs connected to the VNFs 4 in the same cloud platform 3 (Step S11).

Also, the construction unit 12*a* sets a VRF for connection via another conversion device 10 corresponding to a different cloud platform 3 for the VNFs 4 in the different cloud platform 3 with the routers 30 in the WAN 2 (Step S12). As a result, VRFs corresponding to all the VNFs are set in the routers 30 in the WAN 2.

Also, at an end of the chain where there is no VNF to be processed next, the construction unit 12*a* constructs a return VPN for transmitting a packet to a destination user terminal. Note that in the example illustrated in FIG. 4, a default VPN means a network in which a BGP FlowSpec router for redirecting a packet received from a user terminal to a VNF at the head of the chain has been set as will be described later. Also, the return VPN means a network in which no BOP FlowSpec route for redirecting to the VNF has not been set.

Returning to description of FIG. 3, the distribution unit 12*b* distributes a default route designating the conversion device 10 as a transmission destination as a route to a VNF 4 in the cloud platform 3 to which the conversion device 10 belongs, to the routers 30 and other conversion devices 10 in the WAN 2. Also, the distribution unit 12*b* distributes a redirect route to the VNF at the head of the chain when the VNF is in the cloud platform 3 to which the conversion device 10 belongs to the routers 30 in the WAN 2.

Specifically, the distribution unit 12*b* issues an advertisement of a route designating the same conversion device 10 as a transmission destination as a default route to the VNF 4 in the cloud platform 3 to which the same conversion device 10 belongs for the routers 30 and other conversion devices 10 in the WAN 2 in initial setting at the time of network construction as illustrated in FIG. 5 (Step S13).

For example, the conversion device 10 connected to a cloud platform 3 (host) under the controller 20 host machine issues advertisement of a default route to the VPN-A connected to the VNF-A and a default route to the VPN-B connected to the VNF-B in FIG. 4. The conversion device 10 connected to a cloud platform 3 (slave) issues an advertisement of a default route to the VPN-A connected to the VNF-A and a default route to the VPN-C connected to the VNF-C.

Before communication with a user terminal is started, the distribution unit 12*b* sets, for the routers 30, a BGP FlowSpec route for redirecting to the VNF 4 at the head of the chain as a redirect route when the VNF 4 is in the cloud platform 3 to which the same conversion device 10 belongs.

FIG. 5 illustrates a setting example of a redirect route corresponding to a chain with content that "packets coming from an address A are caused to pass through a Web Application Firewall (WAF) and mitigation" (Step S14).

For example, the conversion device 10 connected to the cloud platform 3 (host) in which the WAF is present sets, for the routers 30, a BGP FlowSpec route for "redirecting the address A to the VPN for the WAF (at the head of the chain)" (Step S16).

Note that as illustrated in FIG. 5, the chain 11a is set in each controller 20 slave machine, each conversion device 10, and the CL/SFF in each cloud platform 3 through an instruction from the controller 20 host machine at the time of user setting before communication with the user terminal is started (Step S15). In other words, a chain with the same content as that of the chain 21a set for the controller 20 host machine through an operator's input operation (Step S14) is set in each device. In each device, a route corresponding to the chain is set using the route distributed by the conversion device 10.

Also, the router 30 that has received a packet corresponding to a chain uses the set route to transfer the packet when communication is started. Note that in a case in which a plurality of conversion devices 10 distribute routes to a same type of VNFs 4, a router 30 that has received a packet selects an optimal route in an Interior Gateway Protocol (IGP) among the distributed routes and transfers the packet.

For example, a route with a small distance value of a distance vector-type routing protocol or a route with a low cost for Open Shortest Path First (OSPF) is selected as an optimal route. In this manner, it is possible to draw a packet traffic to the closest cloud in terms of the IGP. As a result, it is possible to implement wide-area chaining passing through the shortest route.

Returning to the description of FIG. 3, the transfer unit 12c transfers a received packet to a recent VNF 4 in the processing order of the chain when the VNF is in the cloud platform 3 to which the conversion device 10 belongs. In addition, the transfer unit 12c transfers the received packet to the conversion device 10 connected to the recent VNF in the processing order of the chain when the VNF 4 is in a cloud platform 3 that is different from the cloud platform 3 to which the conversion device 10 belongs.

Figure 6:
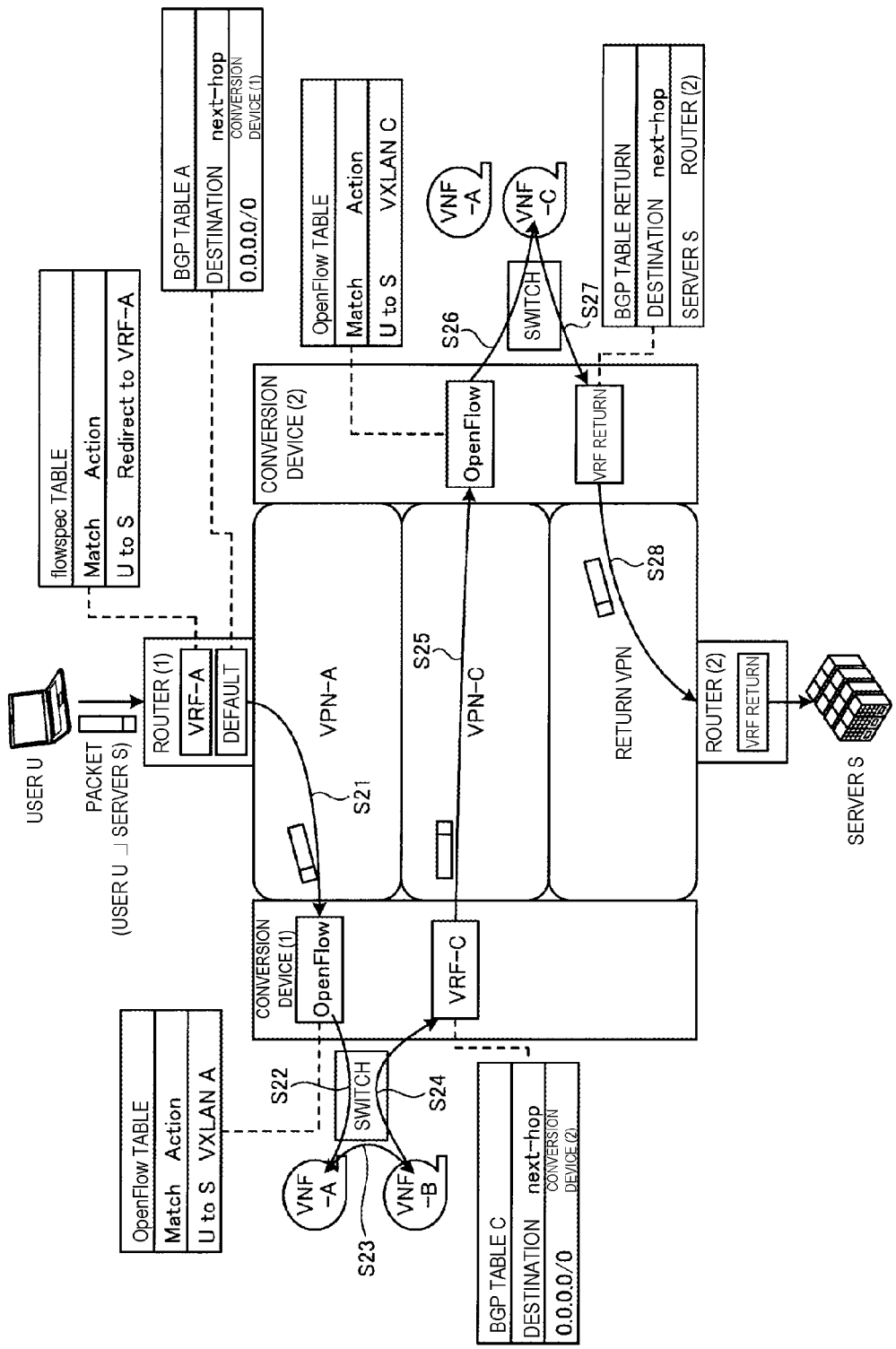
FIG. 6 is an explanatory diagram for explaining processing of the communication system.

Here, processing after communication is started will be described with reference to FIG. 6. FIG. 6 is an explanatory diagram for explaining processing of the communication system 1. FIG. 6 illustrates an exemplary case in which a route corresponding to a chain with content that "packets from the user S to the server S are processed in an order of VNF-A→VNF-B→VNF-C".

A router (1) that has received a packet from the user U transfers the packet to the conversion device (1) in accordance with a FlowSpec table indicating a redirect route to the VNF-A and a BGP table A indicating a default route to the VNF-A (Step S21).

In the conversion device (1) that has received the packet, the transfer unit 12c transfers the packet to the VNF-A using an OpenFlow table indicating a VXLAN A as a destination (Step S22).

In the cloud platform 3, the packet is transferred in an order of VNF-A→VNF-B (Step S23). Next, the packet is transferred to the conversion device (1) using the VNF-C in another cloud platform 3 as a transfer destination (Step S24).

In the conversion device (1), the transfer unit 12c uses a BGP table C indicating a default route to the VNF-C to transfer the packet received from the cloud platform 3 to the conversion device (2) connected to the VNF-C(Step S25).

In the conversion device (2), the transfer unit 12c transfers the packet to the VNF-C using the OpenFlow table indicating a VXLAN C as a destination (Step S26).

Note that transfer to the conversion device (2) connected to the cloud platform 3 is made at the end of the chain (Step S27). In that case, the conversion device (2) transfers the packet to the router (2) connected to the destination server S using "BGP table return" indicating a default route to a return VPN. (Step S28).

Communication Processing

Figure 7:
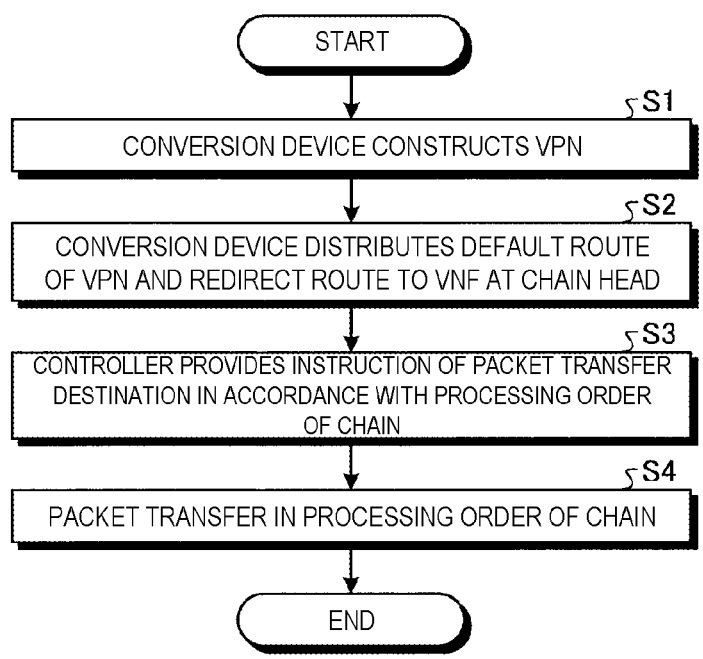
FIG. 7 is a flowchart illustrating an exemplary procedure for communication processing.

Next, communication processing of the communication system 1 according to the embodiment will be described with reference to FIG. 7. FIG. 7 is a flowchart illustrating an exemplary procedure for the communication processing. The flowchart in FIG. 7 is started at a timing at which an operation for providing an instruction for a start is input, for example.

In the conversion device 10, the construction unit 12a constructs a VPN connected to the VNF 4 in the cloud platform 3, in the WAN 2. The construction unit 12a constructs a VPN for transmitting a packet to a destination user terminal at the end of a chain (Step S1).

In the conversion device 10, the distribution unit 12b distributes a route designating the conversion device 10 as a transmission destination as a default route to the VNF 4 in the cloud platform 3 to which the conversion device 10 belongs, to the routers 30 and other conversion devices 10 in the WAN 2. The distribution unit 12b distributes a redirect route to the VNF at the head of the chain when the VNF is in the cloud platform 3 to which the conversion device 10 belongs to the routers 30 in the WAN 2 (Step S2).

In the controller 20, the transfer instruction unit 22a provides an instruction of a packet transfer destination to the conversion device 10 connected to the same cloud platform 3, the VNF 4, or other controllers 20 in the processing order of the chain (Step S3). Each device that has received the instruction of the transfer destination uses the route distributed by the conversion device 10 to set the route corresponding to the chain.

In a case in which a packet corresponding to the chain has been received, the communication system 1 transfers the packet in the processing order of the chain (Step S4). In other words, in the conversion device 10, the transfer unit 12c transfers the received packet to the VNF 4 when the recent VNF in the processing order of the chain is in the cloud platform 3 to which the conversion device 10 itself belongs. The transfer unit 12c transfers the received packet to the conversion device 10 connected to the VNF 4 when the recent VNF in the processing order in the chain 11a is in a cloud platform 3 that is different from the cloud platform 3 to which the conversion device 10 itself belongs. In this manner, the packet is transferred in the processing order of the chain, and a series of the communication processes are completed.

As described above, the communication system 1 according to the embodiment has the conversion devices 10 configured to connect the cloud platforms 3 and the WAN 2 and the controllers 20 disposed for the respective cloud platforms 3. In the communication system 1, the storage unit 11 in each conversion device 10 stores the chain 11a designating the VNF 4 that processes the packet received from the user terminal in the processing order. Also, the construction unit 12a constructs the VPN connected to the VNF 4 in the cloud platform 3 in the WAN 2. In addition, the distribution unit 12b distributes the default route designating the conversion device 10 itself as a transmission destination as a route to the VNF 4 in the cloud platform 3 to which the conversion device 10 itself belongs to the routers 30 and other conversion devices 10 in the WAN 2. Also, the distribution unit 12b distributes the redirect route to the VNF 4 to the routers 30 in the WAN 2 when the VNF at the head of the chain 11a is in the cloud platform 3 to which the conversion device 10 itself belongs.

In the controller 20, the storage unit 21 stores the chain 21a. Also, the transfer instruction unit 22a provides an instruction of a packet transfer destination to the conversion device 10 connected to the same cloud platform, the VNF 4, or other controllers 20 in the processing order of the chain 21a.

In addition, the transfer unit 12c of the conversion device 10 transfers the received packet to the VNF 4 when the recent VNF in the processing order of the chain is in the cloud platform 3 to which the conversion device 10 itself belongs. The transfer unit 12c transfers the received packet to the conversion device 10 connected to the VNF 4 when the recent VNF in the processing order of the chain 11a is in the cloud platform 3 that is different from the cloud platform 3 to which the conversion device 10 itself belongs.

In this manner, it is possible to easily implement service chaining in a wide area across a plurality of clouds/DCs using existing technologies between the WAN section and the cloud/DC section. In addition, it is possible to achieve wide area chaining passing a shortest route by drawing a packet traffic to the closest cloud in terms of the IGP.

Note that the transfer instruction unit 22a provides an instruction of a VNF, which has been designated in an instruction from another controller 20, as a packet transfer destination in a case in which a VNF immediately before the VNF, which has been designated as the packet transfer destination in the instruction from another controller 20, in the processing order of the chain is in the same cloud platform 3 as well.

In other words, the drawing of the packet traffic into the VNF-B is allowed to be carried out both in the processing order represented by the solid-line arrow and in the processing order represented by the dashed-line arrow in the example illustrated in FIG. 4. In other words, drawing of the packet traffic into the VNF-B is allowed both in the case in which the packet traffic is taken over from the VNF-A in the same cloud platform 3 and in the case in which an instruction is provided from the conversion device 10 via the VPN-B.

Figure 8:
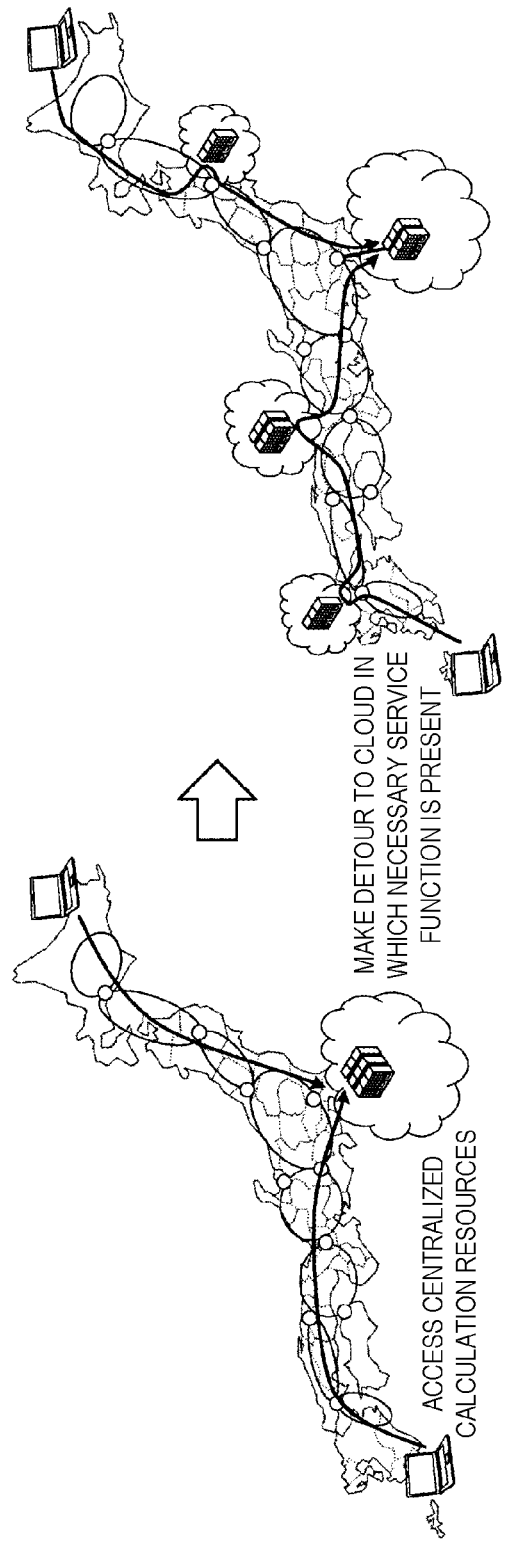
FIGS. 8A and 8B are explanatory diagrams for explaining advantages of the communication processing in the communication system.

FIGS. 8A and 8B are explanatory diagrams for explaining advantages of the communication processing in the communication system 1. As illustrated in FIG. 8A, a server is centralized at one DC, and communication is terminated merely by accessing centralized calculation resources in the related art.

On the other hand, in recent years, cloud/DC platforms are distributed on the basis of concepts of edge computing and CORD as illustrated in FIG. 8B, and communication makes a detour to clouds in which necessary service functions are present and are thus not terminated at one cloud platform. In such a situation, it is possible to terminate communication by allowing the communication to pass between the distributed clouds/DCs through a shortest route according to the communication system 1 in the aforementioned embodiment.

Example

Figure 9:
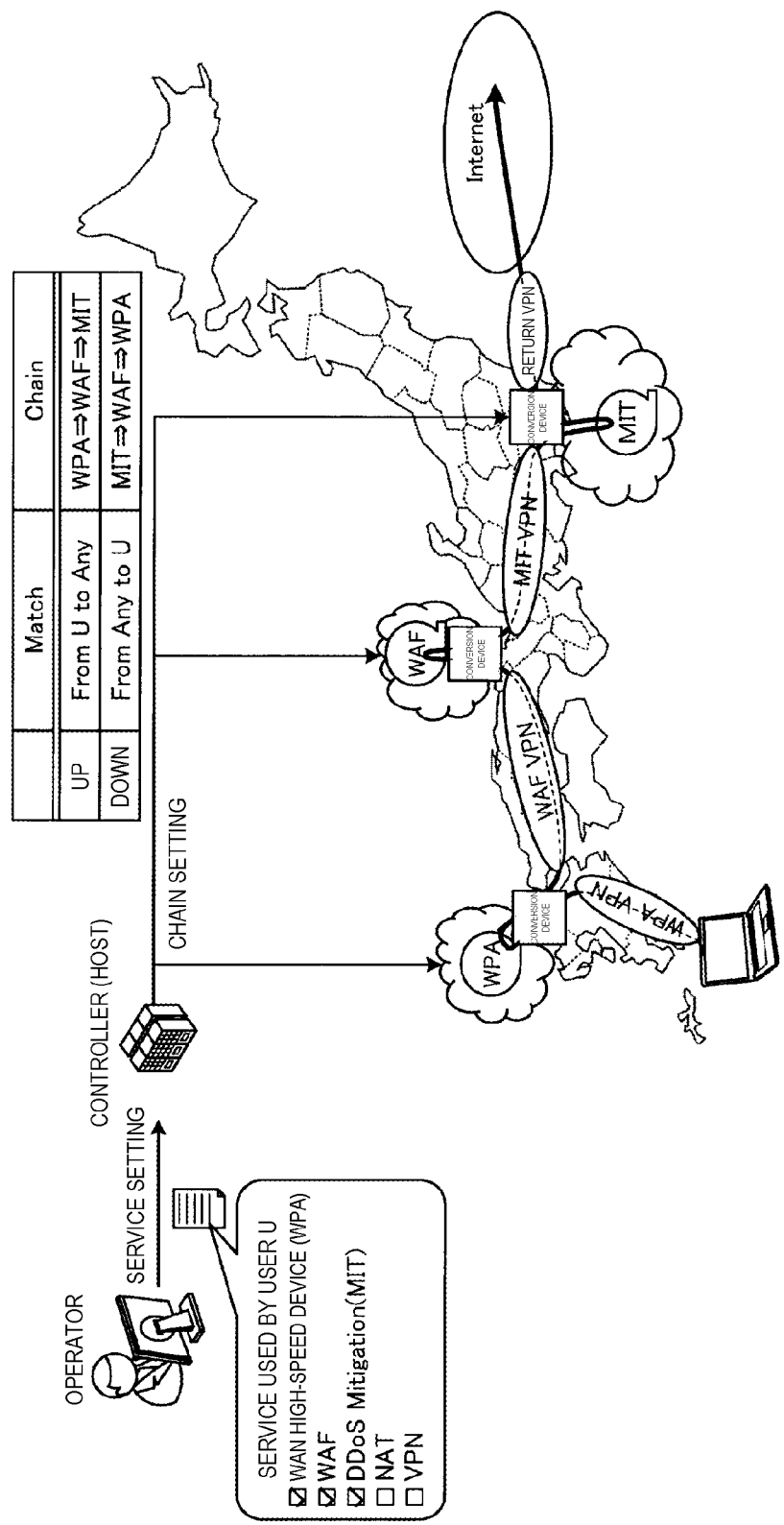
FIG. 9 is an explanatory diagram for explaining an example of the communication processing in the communication system.

FIG. 9 is an explanatory diagram for explaining an example of the communication processing in the communication system 1. FIG. 9 illustrates exemplary processing in a case in which a high-speed WAN, WAF, and DDoS reduced services are provided to a certain user U. In this case, an operator sets utilization of a WAN high speed device (WPA), WAF, and DDoS mitigation (MIT) as a service setting for the user U in the controller 20 host machine.

The controller 20 host machine provides instructions for setting chains to the respective devices in the communication system 1 on the basis of the service setting. For example, chains such as "a packet output by the user U is to be processed in an order of WPA→WAF→MIT" and "a packet for which the user U is designated as a destination is to be processed in an order of MIT→WAF→WPA" are set.

In this manner, the service set for the user U can be provided while allowing the packet traffic output by the user U to pass through the shortest route in the order of WPA VPN→WPA→WAF VPN→WAF→MIT VPN→MIT→return VPN, as illustrated as an example in FIG. 9.

Program

It is also possible to create a program describing the processing executed by the communication system 1 according to the aforementioned embodiment in a computer-executable language. In one embodiment, the conversion devices 10 and the controllers 20 that configure the communication system 1 can be implemented by causing a desired computer to install a communication program executing the aforementioned communication processing as packaged software or on-line software. For example, information processing devices can be caused to function as the conversion devices 10 and the controller 20 in the communication system 1 by causing the information processing devices to execute the aforementioned communication program. An example of computers that execute the communication program for implementing functions that are similar to those of the conversion devices 10 and the controllers 20 in the communication system 1 will be described below.

Figure 10:
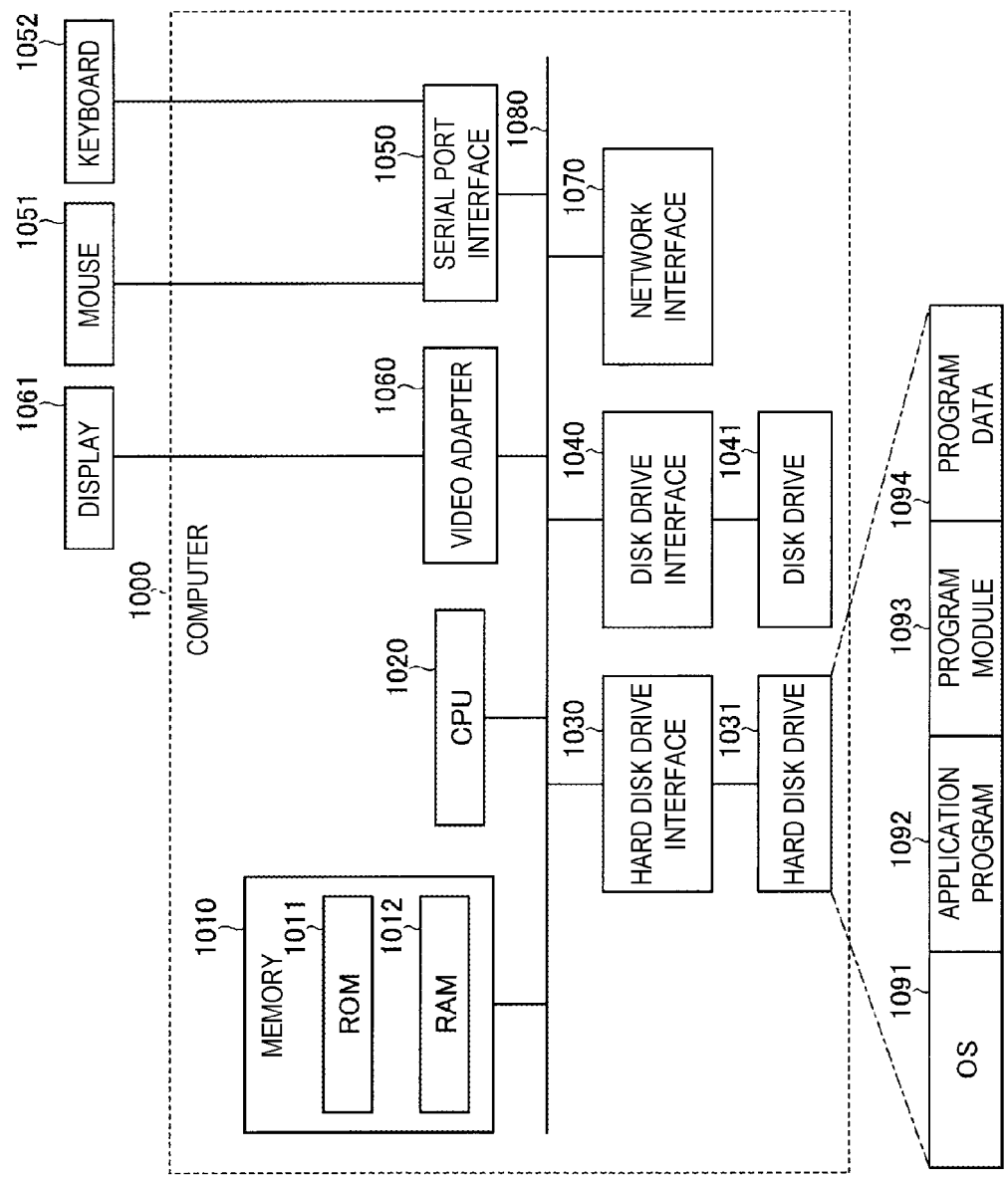
FIG. 10 is an example illustrating an exemplary computer configured to execute a communication program.

FIG. 10 is a diagram illustrating an example of the computers that execute the communication program. A computer 1000 includes, for example, a memory 1010, a CPU 1020, a hard disk drive interface 1030, a disk drive interface 1040, a serial port interface 1050, a video adapter 1060, and a network interface 1070. These components are connected to each other via a bus 1080.

The memory 1010 includes a Read Only Memory (ROM) 1011 and a RAM 1012. The ROM 1011 stores a boot program such as a Basic Input Output System (BIOS), for example. The hard disk drive interface 1030 is connected to a hard disk drive 1031. The disk drive interface 1040 is connected to a disk drive 1041. A removable storage medium such as a magnetic disk or an optical disc, for example, is inserted into the disk drive 1041. A mouse 1051 and a keyboard 1052, for example, are connected to the serial port interface 1050. A display 1061, for example, is connected to the video adapter 1060.

Here, the hard disk drive 1031 stores, for example, an OS 1091, an application program 1092, a program module 1093, and program data 1094. Each table used in the processing is stored in, for example, the hard disk drive 1031 and the memory 1010.

Also, the communication program is stored as a program module 1093, in which commands executed by the computer 1000 are described, in the hard disk drive 1031, for example. Specifically, the program module 1093 in which the processing executed by the communication system 1 as described in the aforementioned embodiment is described is stored in the hard disk drive 1031.

Also, the data used in information processing performed by the communication program is stored as the program data 1094 in the hard disk drive 1031, for example. The CPU 1020 then reads, in the RAM 1012, the program module 1093 and the program data 1094 stored in the hard disk drive 1031 as needed and executes each of the aforementioned procedures.

Note that the program module 1093 and the program data 1094 related to the communication program are not limited to the case in which the program module 1093 and the program data 1094 are stored in the hard disk drive 1031, and the program module 1093 and the program data 1094 may be stored in a removable storage medium, for example, and may be read by the CPU 1020 via the disk drive 1041 or the like. Alternatively, the program module 1093 and the program data 1094 related to the communication program may be stored in another computer connected via a network such as a Local Area Network (LAN) or a WAN and may be read by the CPU 1020 via the network interface 1070.

Although the embodiments to which the present invention made by the present inventor is applied have been described above, the present invention is not limited by any description or drawings as a part of the disclosure of the present invention based on the embodiments. In other words, all other embodiments, examples, running technologies, and the like achieved by those skilled in the art on the basis of the embodiments are included in the scope of the present invention.

REFERENCE SIGNS LIST

1 Communication system
2 WAN
3 Cloud platform
4 VNF
10 Conversion device
11 Storage unit
11*a* Chain
12 Control unit
12*a* Construction unit
12*b* Distribution unit
12*c* Transfer unit
20 Controller
21 Storage unit
21*a* Chain
22 Control unit
22*a* Transfer instruction unit
30 Router

The invention claimed is:

1. A communication system comprising:
a conversion device comprising a computer and configured to connect cloud platforms to a Wide Area Network (WAN); and
controllers respectively disposed for the cloud platforms,
wherein each of the controllers comprises a central processing unit (CPU) and includes a first storage unit comprising a first computer memory device and configured to store a chain that designates, in a processing order, Virtual Network Functions (VNFs) that process a packet received from a user terminal, and
wherein the each of the controllers is configured to provide an instruction of a transfer destination of the packet to a conversion device connected to a same cloud platform, a VNF, or another controller in accordance with the processing order of the chain, and
wherein the conversion device includes a second storage unit comprising the first computer memory device or a second computer memory device and configured to store the chain and a data processing program,
wherein the conversion device is configured to:
construct a Virtual Private Network (VPN), which is connected to a VNF in a cloud platform, in the WAN,
distribute, to a router in the WAN or another conversion device, a route designating the conversion device as a transmission destination that is a route to the VNF in the cloud platform to which the conversion device belongs and distribute, to the router in the WAN, a route to a VNF at a head of the chain when the VNF is in the cloud platform to which the conversion device belongs, and
transfer a received packet to a recent VNF in the processing order of the chain when the VNF is in the cloud platform to which the conversion device belongs and configured to transfer the received packet to the conversion device connected to the recent VNF in the processing order of the chain when the VNF is in a cloud platform that is different from the cloud platform to which the conversion device belongs.

2. The communication system according to claim 1, wherein a router receiving a packet selects an optimal route in an Interior Gateway Protocol (IGP) from among the distributed routes and transfers the packet.

3. The communication system according to claim 1, wherein the conversion device further constructs a VPN for transmitting the packet to a destination user terminal at an end of the chain.

4. A communication system according to claim 1, wherein the each of the controllers also provides an instruction of a VNF designated in an instruction from a different controller as a transfer destination of the packet in a case in which a VNF immediately before a VNF designated as a transfer destination of the packet in an instruction from the different controller in the processing order of the chain is in the same cloud platform.

5. The communication system according to claim 1, wherein the each of the controllers is configured to provide an instruction of a transfer destination of the packet to a conversion device based on a pre-determined communication protocol.

6. A communication method executed by a communication system including a conversion device configured to connect cloud platforms to a Wide Area Network (WAN) and controllers respectively disposed for the cloud platforms, the method comprising:
constructing, by the conversion device comprising a computer, a Virtual Private Network (VPN), which is connected to a Virtual Network Function (VNF) in a cloud platform of one or more computers, in the WAN;
referring, by the conversion device, to a second storage unit configured to store a chain for designating VNFs that process a packet received from a user terminal in a processing order, distributing, to a router in the WAN and another conversion device, a route to a VNF that is in a cloud platform to which the conversion device belongs, and distributing, to the router in the WAN, a route to a VNF at a head of the chain when the VNF is in the cloud platform to which the conversion device belongs;
referring, by one of the controllers, to a first storage unit configured to store the chain and, in accordance with the processing order of the chain, providing an instruction of a transfer destination of the packet to the conversion device connected to a same cloud platform, a VNF, or another controller; and
transferring, by the conversion device, the received packet to a recent VNF in the processing order of the chain when the VNF is in the cloud platform to which the conversion device belongs and transferring the received packet to a conversion device connected to the recent VNF in the processing order of the chain when the VNF is in a cloud platform that is different from the cloud platform to which the conversion device belongs.

7. The communication method according to claim 6, wherein a router receiving a packet selects an optimal route in an Interior Gateway Protocol (IGP) from among the distributed routes and transfers the packet.

8. The communication method according to claim 6 further comprises:
constructing a VPN, by the conversion device, for transmitting the packet to a destination user terminal at an end of the chain.

9. The communication method according to claim 6 further comprises:
providing, by the controller, an instruction of a VNF designated in an instruction from a different controller as a transfer destination of the packet in a case in which a VNF immediately before a VNF designated as a transfer destination of the packet in an instruction from the different controller in the processing order of the chain is in the same cloud platform.

10. The communication method according to claim 6, wherein the each of the controllers is configured to provide an instruction of a transfer destination of the packet to a conversion device based on a pre-determined communication protocol.

* * * * *